S. D. SHEPPERD.
COMB ROLL FOR ROLLER COTTON GINS.
APPLICATION FILED SEPT. 24, 1912.
1,074,473.                                   Patented Sept. 30, 1913.
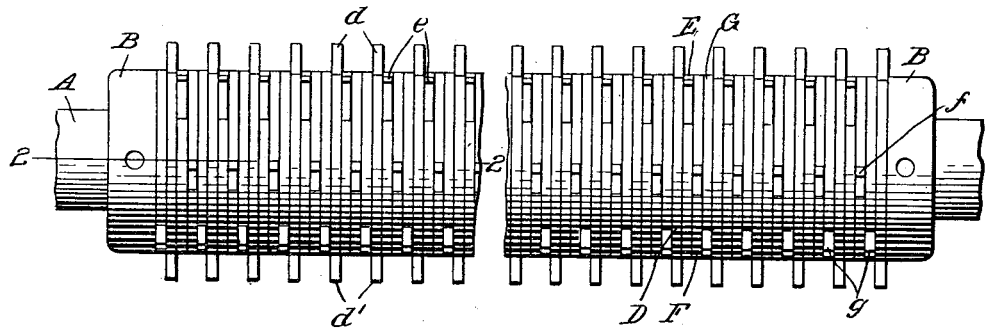
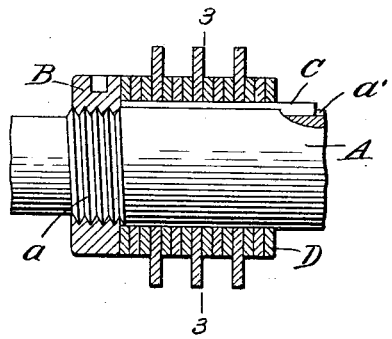    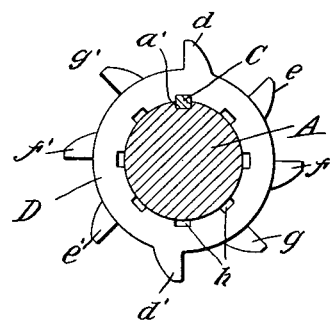
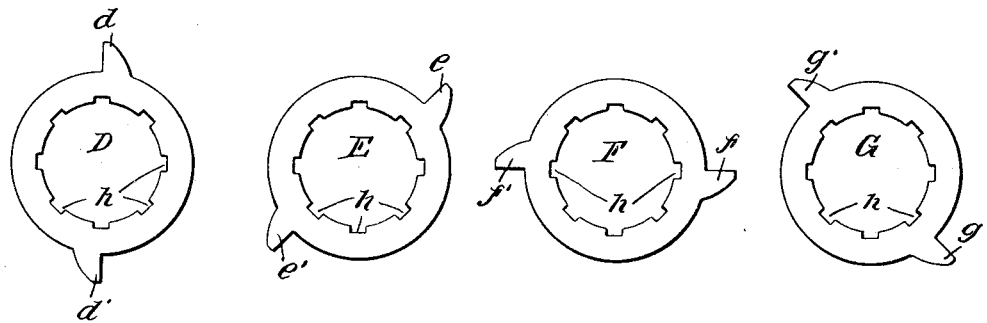
Witnesses
F. C. Gibson.
C. C. Hines.
Inventor
Sylvanus D. Shepperd.
By Victor J. Evans
Attorney
COLUMBIA PLANOGRAPH CO., WASHINGTON, D. C.

UNITED STATES PATENT OFFICE.

SYLVANUS D. SHEPPERD, OF NEWARK, NEW JERSEY.

COMB-ROLL FOR ROLLER COTTON-GINS.

1,074,473.  Specification of Letters Patent.  Patented Sept. 30, 1913.

Application filed September 24, 1912. Serial No. 722,094.

*To all whom it may concern:*

Be it known that I, SYLVANUS D. SHEPPERD, a citizen of the United States, residing at Newark, in the county of Essex and State of New Jersey, have invented new and useful Improvements in Comb-Rolls for Roller Cotton-Gins, of which the following is a specification.

This invention relates to comb rolls for roller cotton gins, and particularly to comb rolls of that type in which the teeth forming the acting surface of the rolls are carried by washers secured to the shaft of the rolls. In rolls of this type as generally constructed, the tooth carrying washers are customarily mounted upon the shaft with spacing washers, whereby provision is made for spacing the teeth of the tooth carrying washers, which are arranged in longitudinal or spiral rows the desired distance apart longitudinally of the shaft, the tooth carrying washers being keyed against rotation and suitably clamped in assembled position. This construction requires the use of a multitude of disks having teeth or key seats variously arranged, and involves the expenditure of time and labor in arranging the same upon the shaft.

The object of the present invention is to provide a comb roll having a set of interchangeable toothed washers with key seats enabling them to be arranged at desired positions upon the shaft to dispose the teeth in the prescribed rows, and whereby the use of spacing washers may be dispensed with and time and labor saved in mounting the toothed washers upon the roll and removing the washers for repairs, replacement or other purposes, as well as to enable the rows of teeth to be spaced at proper intervals for efficient action.

The invention consists of the features of construction, combination and arrangement of parts hereinafter fully described and claimed, reference being had to the accompanying drawings, in which:—

Figure 1 is a side elevation of a comb roll embodying my invention, portions of the roll and its shaft being broken away. Fig. 2 is a longitudinal section through a portion of the roll on the plane indicated by the line 2—2 of Fig. 1. Fig. 3 is a vertical transverse section on the line 3—3 of Fig. 2. Fig. 4 is a view of single washers of the various groups or rows, showing their relative arrangement when in position upon the shaft.

Referring to the drawing, A designates the shaft of the roll, which is provided adjacent each of its ends with a threaded portion *a*, said threaded portion being adapted for the reception of clamping heads or nuts B, whereby the tooth carrying washers are held assembled and clamped against endwise movement on the shaft. The shaft is also provided with a longitudinal groove *a'* for the reception of a key, spline or feather C.

Mounted upon the shaft between the clamping heads or nuts B are tooth carrying washers, each of which is provided with a pair of diametrically disposed teeth, said washers being arranged in a series of longitudinal groups, with the teeth of the washers of each group at different positions about the shaft and the teeth of like washers of the different groups occupying the same relative position about the shaft, thus disposing the teeth in a desired number of longitudinal rows with the teeth of each row equally spaced from the teeth of adjacent rows and arranged circumferentially on lines between the same. In the present instance, the washers are arranged in groups of four washers to each group, the letters D, E, F and G designating the washers of the respective groups and *d, d', e, e', f, f',* and *g, g'* the teeth thereof. As above stated, the washers are arranged in such manner as to dispose their teeth in longitudinal rows which are staggered, break-joint or are disposed on lines between each other and at equal distances apart throughout, circumferentially of the shaft. This arrangement of the washers secures a proper action of the longitudinal rows of teeth in timed accord to efficiently separate the seed from the cotton and to permit the seed separated from the cotton by each longitudinal row of teeth to have clearance for discharge before and during the period of operation of the next succeeding row of teeth.

The toothed washers made in accordance with my invention are interchangeable, so that washers of the same construction may be employed to enable the described arrangement of the washers and teeth to be obtained; or, in other words, so that any washer may be employed as part of any group in a ready, simple and convenient manner, thus permitting washers which are alike in construction to be used and also accurately set with relation to each other and properly keyed to the shaft. To this end, each washer is provided upon its inner periphery with a series of notches or key seats $h$, which are in the present instance eight in number and arranged at regular intervals apart, of the series being disposed in line with the teeth of its particular washer, any one of which notches or seats is adapted for engagement with the key C to hold the washers against circumferential movement about the shaft.

It will thus be understood that the washers may be disposed in different circumferential positions around the shaft for interlocking engagement with the key relative to their teeth, so as to dispose the washers in groups with the teeth arranged in rows at fixed and stated circumferential and longitudinal intervals, the teeth thus providing an acting surface of an efficient character for coöperation with the doctor blade and ginning roll of the gin in effecting the separation of the cotton and seed. As the washers are all alike in construction, their cost of manufacture is not increased over washers of the ordinary type, while their described method of use enables the desired spacing action to be obtained and the use of spacing washers to be dispensed with, whereby economy in the production of the roll is obtained. Furthermore, the key seats adapt the washers to be accurately positioned to engage the key C in order to arrange the teeth in their proper relative positions upon the shaft, thus reducing the amount of time and labor in setting the washers over constructions employing toothed washers of the ordinary type.

I claim:—

1. A comb roller comprising a shaft, a longitudinal key or feather connected therewith, a series of toothed washers arranged in abutting relation about the shaft and having circumferential key seats for engagement with said key or feather, whereby the washers may be arranged in groups to dispose the teeth in spaced relation longitudinally and circumferentially and interchangeably keyed to the shaft, and means for holding the washers assembled against longitudinal displacement on the shaft.

2. A comb roller comprising a shaft, a series of toothed washers mounted thereon in abutting relation in groups with the teeth thereof circumferentially and longitudinally spaced, means whereby each washer is locked to the shaft against circumferential movement and adapted to be locked in any one of a series of positions, whereby the disks are rendered interchangeable so that any disk may be employed in the arrangement of any group, and means for holding the washers assembled against longitudinal displacement on the shaft.

In testimony whereof I affix my signature in presence of two witnesses.

SYLVANUS D. SHEPPERD.

Witnesses:
GEORGE M. BROOKS,
WM. HOWARD HOOPLE.

---

Copies of this patent may be obtained for five cents each, by addressing the "Commissioner of Patents, Washington, D. C."